US011871201B2

(12) United States Patent
Xiao et al.

(10) Patent No.: US 11,871,201 B2
(45) Date of Patent: Jan. 9, 2024

(54) SPEAKER

(71) Applicant: AAC Microtech (Changzhou) Co., Ltd., Changzhou (CN)

(72) Inventors: Bo Xiao, Shenzhen (CN); Chenliang Kong, Shenzhen (CN); Tong Zhang, Shenzhen (CN); Ronglin Linghu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 61 days.

(21) Appl. No.: 17/833,774

(22) Filed: Jun. 6, 2022

(65) Prior Publication Data

US 2023/0209271 A1 Jun. 29, 2023

(30) Foreign Application Priority Data

Dec. 24, 2021 (CN) ......................... 202123302358.4

(51) Int. Cl.
*H04R 9/02* (2006.01)
*H04R 9/06* (2006.01)
*H04R 1/02* (2006.01)

(52) U.S. Cl.
CPC ............. *H04R 9/025* (2013.01); *H04R 1/025* (2013.01); *H04R 9/06* (2013.01)

(58) Field of Classification Search
CPC ........... H04R 1/025; H04R 9/025; H04R 9/06
See application file for complete search history.

(56) References Cited

U.S. PATENT DOCUMENTS

2018/0302722 A1* 10/2018 Linghu .................. H04R 9/025

* cited by examiner

*Primary Examiner* — Kile O Blair
(74) *Attorney, Agent, or Firm* — W&G Law Group

(57) ABSTRACT

The present disclosure provides a speaker including a housing and a vibration system and a magnetic circuit unit that are received in the housing. The magnetic circuit unit includes lower clamp plate and magnetic circuit assembly arranged on lower clamp plate. A central area of lower clamp plate abuts against bottom wall of the housing. An edge area of lower clamp plate is spaced from the bottom wall. The edge area is provided with flange portion bending and extending from lower clamp plate toward the bottom wall. The flange portion abuts against the bottom wall. The flange portion abuts against the bottom wall. In this way, when speaker falls off, flange portions come in contact with bottom wall, such that stability of magnetic circuit unit can be improved, then operational performance and service life can be improved.

15 Claims, 3 Drawing Sheets

SPEAKER

TECHNICAL FIELD

The present disclosure belongs to the technical field of electroacoustic transducers, and in particular, to a speaker.

BACKGROUND

A speaker includes a housing and a vibration system and a magnetic circuit unit that are received in the housing. First of all, a magnetic gap is formed in the magnetic circuit unit. The vibration system is placed in the magnetic gap by using a voice coil. In this case, after electrification, the voice coil vibrates at different frequencies in the magnetic gap of the magnetic circuit unit, such that the vibration system vibrates to produce sound. In a current conventional speaker, the magnetic circuit unit includes a lower clamp plate and a magnetic circuit assembly. The lower clamp plate is in a plate shape. A lower surface of the lower clamp plate abuts against the housing. An upper surface of the lower clamp plate is provided with a magnetic circuit assembly. When the speaker of the above mentioned structure falls off, as the magnetic circuit assembly has poor stability, operational performance of the speaker is affected.

SUMMARY

The present disclosure is intended to provide a speaker to solve at least one of the technical problems in the related art.

The present disclosure provides a speaker, the speaker including a housing and a vibration system and a magnetic circuit unit that are received in the housing, the magnetic circuit unit including a lower clamp plate and a magnetic circuit assembly arranged on the lower clamp plate, a central area of the lower clamp plate abutting against a bottom wall of the housing, an edge area of the lower clamp plate is spaced from the bottom wall of the housing, wherein the edge area of the lower clamp plate is provided with at least one flange portion bending and extending from the lower clamp plate toward the bottom wall of the housing, and the flange portion abuts against the bottom wall of the housing.

In some embodiments, the edge area of the lower clamp plate is provided with a plurality of flange portions, and the plurality of flange portions are spaced from one another along a circumferential direction of the lower clamp plate.

In some embodiments, the lower clamp plate has a major-axis direction and a minor-axis direction, the lower clamp plate includes two short sides spaced from and opposite to each other along the major-axis direction and two long sides spaced from and opposite to each other along the minor-axis direction, and the long sides and/or the short sides are provided with the flange portions.

In some embodiments, the two long sides are symmetrically provided with two of the flange portions; and/or the two short sides are symmetrically provided with two of the flange portions.

In some embodiments, the bottom wall of the housing includes a first bottom wall and a second bottom wall extending from the first bottom wall toward the lower clamp plate, the first bottom wall abuts against the flange portion, and the second bottom wall abuts against the central area of the lower clamp plate.

In some embodiments, the magnetic circuit assembly includes a first magnet, a second magnet, and a pole plate; and the first magnet and the second magnet are arranged on a side of the lower clamp plate away from the bottom wall of the housing, the second magnet is arranged on an outer side of the first magnet and has a magnetic gap with the first magnet, and the pole plate is stacked on a side of the first magnet away from the lower clamp plate.

In the speaker according to the present disclosure, the edge area of the lower clamp plate is provided with one or more flange portions bending and extending from the lower clamp plate toward the bottom wall of the housing. The flange portion abuts against the bottom wall of the housing. In this way, when the speaker falls off due to external force or other reasons, the flange portions come in contact with the bottom wall of the housing, such that stability of the magnetic circuit unit can be improved, and then operational performance and service life of the speaker can be improved.

DESCRIPTION OF EMBODIMENTS

To enable those skilled in the art to better understand the technical solution of the present disclosure, the present disclosure is further described in detail below with reference to the accompanying drawings and specific embodiments.

Figure 1:
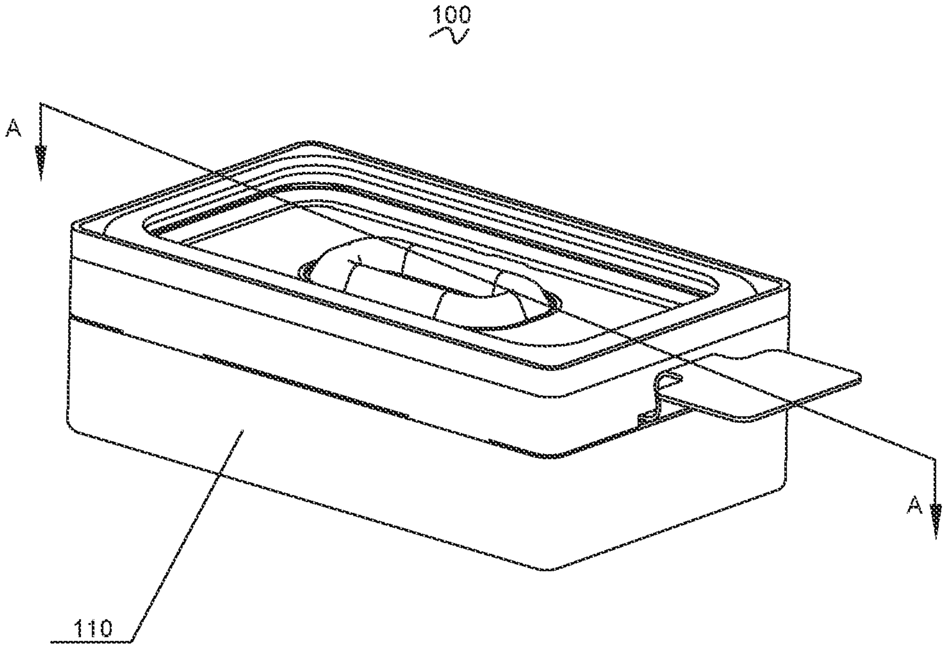
FIG. 1 is a schematic structural diagram of a speaker according to an embodiment of the present disclosure.
Figure 2:
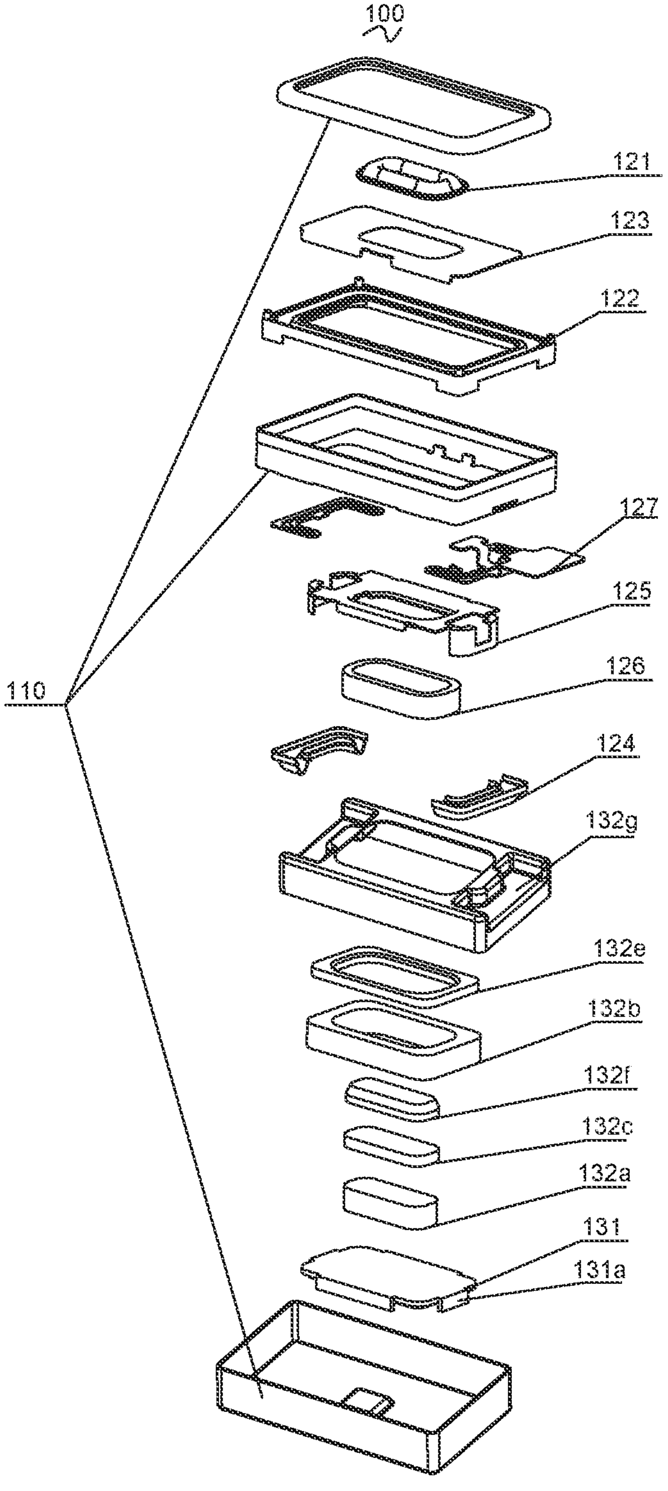
FIG. 2 is an exploded view of the speaker shown in FIG. 1.
Figure 3:
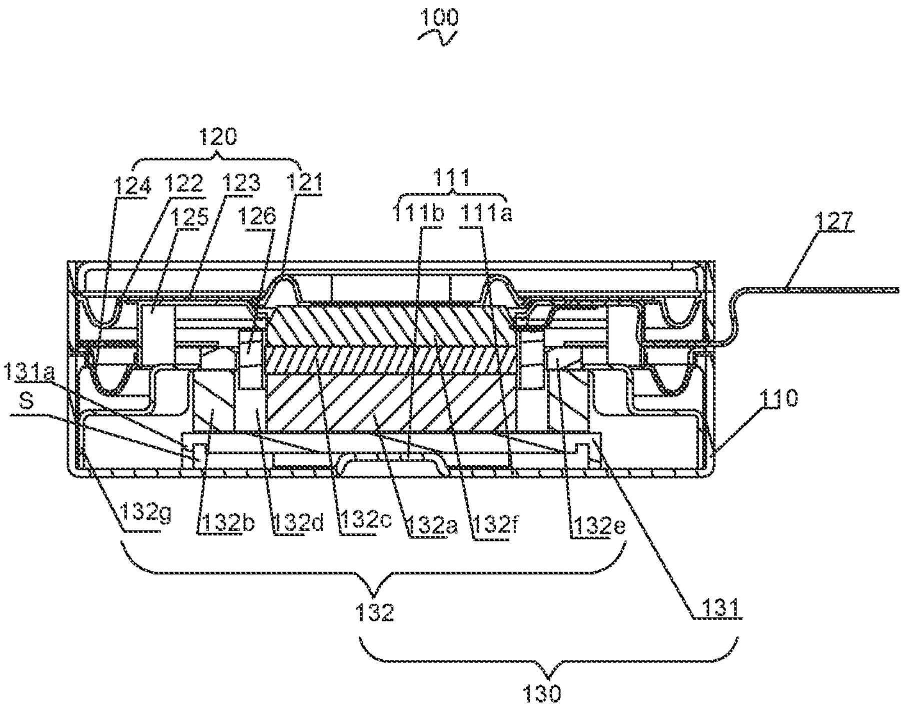
FIG. 3 is a sectional view of the speaker shown in FIG. 1 taken along a direction AA.

As shown in FIG. 1 to FIG. 3, an embodiment of the present disclosure relates to a speaker 100. The speaker 100 includes a housing 110, and a vibration system 120 and a magnetic circuit unit 130 that are received in the housing 110. The magnetic circuit unit 130 includes a lower clamp plate 131 and a magnetic circuit assembly 132 arranged on the lower clamp plate 131. A central area of the lower clamp plate 131 abuts against a bottom wall 111 of the housing. A gap S is provided between an edge area of the lower clamp plate 131 and the bottom wall 111 of the housing. The edge area of the lower clamp plate 131 is provided with at least one flange portion 131*a* bending and extending from the lower clamp plate 131 toward the bottom wall of the housing 111, and the flange portion 131*a* abuts against the bottom wall 111 of the housing.

In the speaker according to this embodiment, the edge area of the lower clamp plate is provided with one or more flange portions bending and extending from the lower clamp plate toward the bottom wall of the housing. The flange portion abuts against the bottom wall of the housing. In this way, when the speaker falls off due to external force or other reasons, the flange portions come in contact with the bottom wall of the housing, such that stability of the magnetic circuit unit can be improved, and then operational performance and service life of the speaker can be improved.

Figure 4:
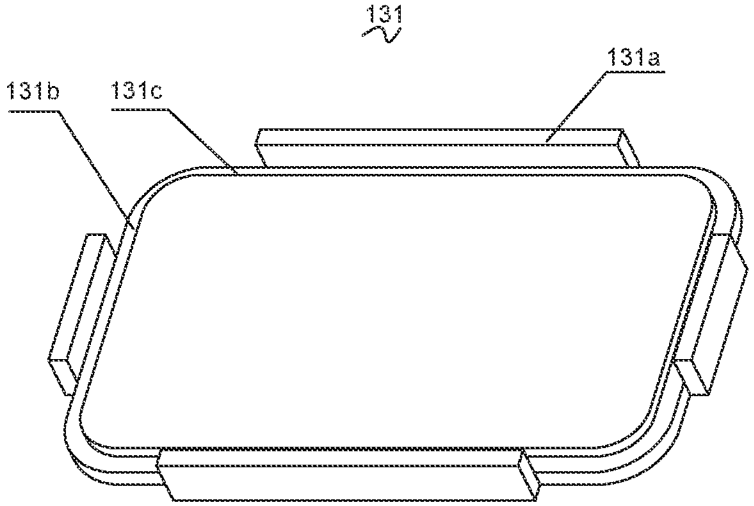
FIG. 4 is a schematic structural diagram of a lower clamp plate in the speaker shown in FIG. 1.

For example, in order to further improve the stability of the magnetic circuit unit, as shown in FIG. 2 and FIG. 4, the edge area of the lower clamp plate 131 is provided with a plurality of flange portions 131*a*, and the plurality of flange portions 131*a* are spaced from one another along a circumferential direction of the lower clamp plate 131. For example, the plurality of flange portions 131*a* may be equally spaced from one another along the circumferential direction of the lower clamp plate 131, or the plurality of flange portions 131*a* may also be non-equally spaced from one another along the circumferential direction of the lower clamp plate 131. For example, the gaps between the plurality of flange portions 131*a* may be successively increased, successively decreased, randomly distributed, or the like, which may be specifically determined according to an actual requirement, and is not limited in this embodiment.

For example, as shown in FIG. 4, the lower clamp plate 131 has a major-axis direction and a minor-axis direction, the lower clamp plate 131 includes two short sides 131*b* spaced from and opposite to each other along the major-axis direction and two long sides 131*c* spaced from and opposite to each other along the minor-axis direction. In order to further improve the stability of the magnetic circuit unit, as shown in FIG. 4, the long sides 131*c* and the short sides 131*b* of the lower clamp plate 131 are provided with the flange portions 131*a*. Certainly, in addition, the flange portions 131*a* may be arranged only one the long sides 131*c* of the lower clamp plate 131, or the flange portions 131*a* may be arranged only on the short sides 131*b* of the lower clamp plate 131, which may be specifically determined according to an actual requirement, and is not limited in this embodiment.

For example, in order to further improve the stability of the magnetic circuit unit, as shown in FIG. 4, the two long sides 131*c* and the two short sides 131*b* of the lower clamp plate 131 are each symmetrically provided with two of the flange portions 131*a*. That is, as shown in FIG. 4, the two long sides 131*c* of the lower clamp plate 131 are symmetrically provided with two flange portions 131*a*, and the two short sides 131*b* of the lower clamp plate 131 are also symmetrically provided with two flange portions 131*a*. Certainly, in addition, only the two long sides 131*c* of the lower clamp plate 131 may be symmetrically provided with two flange portions 131*a*, or only the two short sides 131*b* of the lower clamp plate 131 may be symmetrically provided with two flange portions 131*a*, which may be specifically determined according to an actual requirement, and is not limited in this embodiment.

For example, as shown in FIG. 3, the bottom wall 111 of the housing includes a first bottom wall 111*a* and a second bottom wall 111*b* extending from the first bottom wall 111*b* toward the lower clamp plate 131, the first bottom wall 111*a* abuts against the flange portion 131*a*, and the second bottom wall 111*b* abuts against the central area of the lower clamp plate 131.

For example, as shown in FIG. 2 and FIG. 3, the magnetic circuit assembly 132 includes a first magnet 132*a*, a second magnet 132*b*, and a pole plate 132*c*. The first magnet 132*a* and the second magnet 132*b* are arranged on one side of the lower clamp plate 131 away from the bottom wall 111 of the housing, the second magnet 132*b* is arranged on an outer side of the first magnet 132*a* and has a magnetic gap 132*d* with the first magnet 132*a*, and the pole plate 132*c* is stacked on one side of the first magnet 132*a* away from the lower clamp plate 131.

In addition to including the above structures, as shown in FIG. 3, the magnetic circuit assembly 132 further includes an upper clamp plate 132*e*, a third magnet 132*f*, and a support ring 132*g*. The upper clamp plate 132*e* is arranged on the second magnet 132*b*. The third magnet 132*f* is arranged on the pole plate 132*c*. A first end of the support ring 132*g* is supported on the bottom wall 111 of the housing. A second end of the support ring 132*g* is arranged on the first magnet 132*a* and supports the vibration system 120.

For example, as shown in FIG. 2 and FIG. 3, the vibration system 120 may include a middle membrane 121 at a middle position, an upper diaphragm 122 spaced around the middle membrane 121, a dome 123 connected to the middle membrane 121 and the upper diaphragm 122, a lower diaphragm 124 located below the upper diaphragm 122, a voice coil 126 inserted in the magnetic gap 132*d* through a framework 125, and a circuit board 127 electrically connected to the voice coil 125. Certainly, in addition, the vibration system may further include some other structures, or omit some structures in this embodiment, which is not limited in this embodiment.

It should be understood that the above embodiments are only illustrative embodiments used to illustrate the principles of the present disclosure, but the present disclosure is not limited thereto. For those of ordinary skill in the art, various transformations and improvements may be made without departing from the spirit and essence of the present disclosure. Such transformations and improvements may also be regarded as the protection scope of the present disclosure.

What is claimed is:

1. A speaker, comprising a housing, and a vibration system and a magnetic circuit unit that are received in the housing, wherein the magnetic circuit unit comprises a lower clamp plate and a magnetic circuit assembly arranged on the lower clamp plate, a central area of the lower clamp plate abuts against a bottom wall of the housing, and an edge area of the lower clamp plate is spaced from the bottom wall of the housing, and wherein the edge area of the lower clamp plate is provided with at least one flange portion bending and extending from the lower clamp plate toward the bottom wall of the housing, and the at least one flange portion abuts against the bottom wall of the housing.

2. The speaker as described in claim 1, wherein an area of the bottom wall of the housing, corresponding to the edge area of the lower clamp plate, is provided with a boss extending toward the vibration system, and the central area of the lower clamp plate abuts against the boss.

3. The speaker as described in claim 2 wherein the bottom wall of the housing comprises a first bottom wall and a second bottom wall extending from the first bottom wall toward the lower clamp plate, the first bottom wall abuts against the flange portion, and the second bottom wall abuts against the central area of the lower clamp plate.

4. The speaker as described in claim 2, wherein the magnetic circuit assembly comprises a first magnet, a second magnet, and a pole plate; and the first magnet and the second magnet are arranged on a side of the lower clamp plate away from the bottom wall of the housing, the second magnet is arranged on an outer side of the first magnet and a magnetic gap is disposed between the second magnet and the first magnet, and the pole plate is stacked on a side of the first magnet away from the lower clamp plate.

5. The speaker as described in claim 1, wherein the edge area of the lower clamp plate is provided with a plurality of flange portions, and the plurality of flange portions are spaced from one another along a circumferential direction of the lower clamp plate.

6. The speaker as described in claim 5, wherein the lower clamp plate has a major-axis direction and a minor-axis direction, the lower clamp plate comprises two short sides spaced from and opposite to each other along the major-axis direction and two long sides spaced from and opposite to each other along the minor-axis direction, and the two long sides and/or the two short sides are provided with the flange portions.

7. The speaker as described in claim 6, wherein the two long sides are symmetrically provided with two of the flange portions respectively; and/or the two short sides are symmetrically provided with two of the flange portions respectively.

8. The speaker as described in claim 7, wherein the bottom wall of the housing comprises a first bottom wall and a second bottom wall extending from the first bottom wall toward the lower clamp plate, the first bottom wall abuts against the flange portion, and the second bottom wall abuts against the central area of the lower clamp plate.

9. The speaker as described in claim 7, wherein the magnetic circuit assembly comprises a first magnet, a second magnet, and a pole plate; and the first magnet and the second magnet are arranged on a side of the lower clamp plate away from the bottom wall of the housing, the second magnet is arranged on an outer side of the first magnet and a magnetic gap is disposed between the second magnet and the first magnet, and the pole plate is stacked on a side of the first magnet away from the lower clamp plate.

10. The speaker as described in claim 6, wherein the bottom wall of the housing comprises a first bottom wall and a second bottom wall extending from the first bottom wall toward the lower clamp plate, the first bottom wall abuts against the flange portion, and the second bottom wall abuts against the central area of the lower clamp plate.

11. The speaker as described in claim 6, wherein the magnetic circuit assembly comprises a first magnet, a second magnet, and a pole plate; and the first magnet and the second magnet are arranged on a side of the lower clamp plate away from the bottom wall of the housing, the second magnet is arranged on an outer side of the first magnet and a magnetic gap is disposed between the second magnet and the first magnet, and the pole plate is stacked on a side of the first magnet away from the lower clamp plate.

12. The speaker as described in claim 5, wherein the bottom wall of the housing comprises a first bottom wall and a second bottom wall extending from the first bottom wall toward the lower clamp plate, the first bottom wall abuts against the flange portion, and the second bottom wall abuts against the central area of the lower clamp plate.

13. The speaker as described in claim 5, wherein the magnetic circuit assembly comprises a first magnet, a second magnet, and a pole plate; and the first magnet and the second magnet are arranged on a side of the lower clamp plate away from the bottom wall of the housing, the second magnet is arranged on an outer side of the first magnet and a magnetic gap is disposed between the second magnet and the first magnet, and the pole plate is stacked on a side of the first magnet away from the lower clamp plate.

14. The speaker as described in claim 1, wherein the bottom wall of the housing comprises a first bottom wall and a second bottom wall extending from the first bottom wall toward the lower clamp plate, the first bottom wall abuts against the flange portion, and the second bottom wall abuts against the central area of the lower clamp plate.

15. The speaker as described in claim 1, wherein the magnetic circuit assembly comprises a first magnet, a second magnet, and a pole plate; and the first magnet and the second magnet are both arranged at a side of the lower clamp plate away from the bottom wall of the housing, the second magnet is arranged at an outer side of the first magnet and a magnetic gap is formed between the second magnet and the first magnet, and the pole plate is stacked at a side of the first magnet away from the lower clamp plate.

* * * * *